July 15, 1969 — G. B. FOSTER ET AL — 3,455,148
ACCELERATION MONITOR (G-SWITCH)
Filed Sept. 24, 1965 — 3 Sheets-Sheet 1

FIG.1

INVENTORS
GEORGE B. FOSTER
KENNETH A. OSTRANDER

BY LeBlanc & Shur
ATTORNEYS

United States Patent Office 3,455,148
Patented July 15, 1969

3,455,148
ACCELERATION MONITOR (G-SWITCH)
George B. Foster, Worthington, and Kenneth A. Ostrander, Columbus, Ohio, assignors to Reliance Electric and Engineering Company, Cleveland, Ohio, a corporation of Ohio
Filed Sept. 24, 1965, Ser. No. 489,883
Int. Cl. G01p 15/12; G08b 21/00; G01m 1/22
U.S. Cl. 73—71.2                                  12 Claims

ABSTRACT OF THE DISCLOSURE

There is disclosed herein an acceleration monitoring system having a piezoelectric transducer coupled to a high input impedance amplifier system. The output of the amplifier system is connected to an acceleration level sensing circuit and a limit sensor to provide an indication when the measured acceleration exceeds a predetermined level. The amplifier system includes a feedback sensitivity control circuit providing variable, primarily capacitive feedback and highly capacitive input impedance for the amplifier and also serves to select the predetermined level at which the limit sensor operates to provide the desired indication.

---

This invention relates to vibration monitoring, and more particularly to apparatus which provides a continuous indication of the acceleration associated with vibration of a structure and includes means to provide an accurate and repeatable indication whenever the acceleration exceeds a predetermined maximum level.

It has been the general practice in connection with the use of rotating or reciprocating machines, or other mechanical equipment, to provide monitors or sensors to detect excessive vibration of the machines during operation. This practice is based on recognition that a vibration level in excess of that normally associated with the particular machine is often an indication of impending failure or malfunction of one or more parts of the mechanism.

Typically, the above monitoring is accomplished by attaching vibration transducers to the machine which measure the actual displacement of the part to which the sensor is attached and provide an electrical signal proportional or otherwise related to this displacement. However, it has been found that in certain situations there are distinct advantages in using a sensor which responds not to vibration itself, but either to the velocity of the member or to its acceleration.

Specifically, consider a mechanical structure or machine part which is vibrating, either in a manner normally associated with its operation or at a level greater than that acceptable for the continued operation of that particular machine. Considering a constant amplitude sinusoidal displacement, it may be readily understood that the maximum value of the acceleration will be proportional to the square of the frequency of vibration; i.e., for a given amplitude of vibration, higher frequencies of vibration necessarily imply greater acceleration of the structure. Conversely, considering a member vibrating at a given fixed frequency, it may be understood that the greater the amplitude of vibration, the greater will be the level of acceleration associated therewith.

In the case of low-speed machinery such as reciprocating engines, wherein amplitudes of vibration of the order of 0.03 inch would typically be an indication of an impending malfunction, it has proven to be impractical to sense such vibration on the basis of the acceleration of the vibrating member. The primary reason for this is that in the typical machine shop, or other industrial site, there are present a wide variety of low-frequency random vibrations with which there would be associated acceleration levels of the order of 1 g. To prevent response to such random harmless vibrations but not to critical vibration of the machines themselves, the sensors should be adapted to reject such low-level random vibrations. Thus it is necessary that an acceleration sensor for use in such environments be adapted to respond only to accelerations of approximately 1 g or greater.

In reality, vibration of 0.03 inch, a typical critical level in a low-frequency machine, is associated with far less than 1 g of acceleration. In fact, for a machine operating at approximately 300 r.p.m., there would be required approximately 0.8 inch of movement to cause an acceleration of the member of the order of 1 g. Accordingly, it may be seen that a part in a low-frequency machine which would be subject to approximately 1 g of acceleration would literally tear itself apart before an acceleration sensor could provide a reasonably meaningful indication of the vibration.

In contrast, however, in the case of higher speed machinery—for example, machines operating in the vicinity of 3600 r.p.m., the acceleration associated with an 0.03 inch displacement would be considerably greater, and would therefore be capable of satisfactory monitoring by an acceleration-sensitive sensor. However, in highspeed machinery a considerably smaller displacement represents a critical level of vibration than in a machine operating at a slower speed. For example, a typical critical amplitude of vibration in a machine operating at 3600 r.p.m. would be of the order of 0.005 inch. While the acceleration associated with such displacements at 3600 r.p.m. is sufficient to be meaningfully measured by available acceleration sensors, limitations of the equipment associated with such sensors has prevented their widespread use. Accordingly, it has been the practice to employ displacement-type sensors even for high-frequency vibration.

However, since the low-frequency random vibrations typically persent on the machine site are often of greater amplitude than the critical high-frequency vibrations in the machine, it has generally been necessary to filter the output of the position sensor to eliminate the low-frequency background vibration. Unfortunately, such highpass filters must be sharply selective, and, as a result, add significantly to the cost of the position-sensing apparatus.

Significantly, measurement of the acceleration alleviates this problem. As stated above, for a constant amplitude of vibration, the acceleration varies with the square of the frequency. Hence it may be understood that for a given amplitude of vibration, a change of a factor of two in the frequency of the vibration will result in a signal output from an acceleration sensor increased by a factor of four. In effect, therefore, it may be seen that measurement of accelerations results in 12 db per octave (or 20 db per decade) of increased sensitivity at higher frequencies. This means, in effect, that use of acceleration sensors at high frequencies provides an inherent 20 db per decade high-pass filter with no additional cost or added equipment. Thus it may be understood that the availability of suitable monitoring equipment for use with acceleration sensors would be most desirable.

In addition, whether the sensor responds to the amplitude of the vibration or the associated acceleration, it may be desirable to have both a continuous indication of the vibration and, in addition, an indication whenever the vibration level exceeds a preset critical maximum. For example, in order to assess the long-term operating characteristics of the machine, a permanent record of the vibration levels in the machine at all times during its operation would be needed. However, in the event that the vibrations reach a level such that breakdown or failure is imminent, it is necessary to provide an alarm and to stop the machine so that appropriate repairs can be made. Flexibility of the monitoring apparatus further requires the critical level of vibration be variable and that it be possible to accurately set this critical level.

In addition, under certain circumstances, it is desirable to vary the system response to permit the rejection of transient acceleration signals that have no significant effect on the operation of the machine being monitored. In this way, even high-frequency vibrations of extremely short duration or background vibrations originating outside of the machine being monitored, will not cause the machine to be shut down.

A further desirable feature would be the ability of the system to respond only to the dominant one of a plurality of modes of vibration present. On the other hand, the normal operation of the system should be such that it will respond to the instantaneous peak value of the vibration, with or without rejection of short-duration transients.

Heretofore there has been no equipment available to adequately meet the requirements outlined above in a commercially satisfactory manner, nor has there been a full understanding or correlation of the various factors which have been outlined. This is especially true in the case of acceleration-sensing equiment. One previous acceleration sensor which has been used in the monitoring of machine performance comprises a magnetically restrained mass which serves to close a switch when the acceleration exceeds a predetermined level, whereby the force on the restrained mass is sufficiently great to overcome the force of the restraining magnet. Such devices are quite inaccurate and, of course, are only useful as an indication that a critical level of acceleration has been exceeded. In addition, because of the mechanical nature of the sensing element, these devices have been severely limited in frequency response, and in general have not proved particularly useful.

In contrast, there are now available highly sensitive piezoelectric sensors having extremely wide frequency-response characteristics, which provide the further advantage of not being affected by the magnetic fields generated by rotating electric machinery. As previously indicated, the use of acceleration sensors for high frequency provides an inherent rejection of low-frequency vibrations. Therefore, piezoelectric detectors would appear to offer considerable promise for use in vibration-monitoring equipment. However, these sensors have suffered from the fact that it is generally desirable to locate the monitoring equipment at a considerable distance from the machine or other equipment being monitored. This means that the acceleration sensor must be connected with the remainder of the system by means of an electrical conductor or other suitable signal channel. The use of such long interconnecting conductors with piezoelectric transducers creates a number of problems, which has heretofore severely limited the usefulness of such devices in the monitoring of industrial equipment. For example, the piezoelectric transducer is effectively a variable capacitor. Therefore, prior-art input circuitry, such as electrometers and other high-input-impedance devices which would be connected to the capacitive transducer by means of the typical shielded cable, are extremely unsatisfactory. This is a result of the matching problems arising from the variation of the capacitance of the conductor according to its length. While it is possible to solve this problem by placing suitable impedance converters at the site of the vibration transducer itself, this exposes the converter to the vibrations of the machine and various other adverse characteristics of the machine environment. Placement of the impedance converter at some intermediate position between the sensor and the monitoring equipment overcomes the environmental difficulties, but adds significantly to the manufacturing and installation expense. Thus it is clear that considerable improvement could be afforded by the provision of suitable input circuitry to overcome the matching problems associated with the crystal transducers while providing, in addition, the desirable flexibility and design features previously outlined. In addition, it would be desirable to provide such a system having sufficient flexibility for use, with amplitude sensors as well as acceleration sensors with a minimum amount of modification.

Accordingly, it is a general object of the present invention to provide improved apparatus to protect machines from excessive vibration. More specifically, it is an object of this invention to provide acceleration-responsive apparatus giving a continuous indication of the level of vibration, and actuating an alarm signal when the vibration exceeds a predetermined variable level. It is a further object of this invention to provide monitoring equipment which is readily adaptable for use with position- or velocity-responsive sensors as well as with acceleration-responsive sensors.

It is another object of this invention to provide vibration-monitoring equipment employing piezoelectric acceleration sensors. A related object of this invention is to provide a practical piezoelectric acceleration monitor wherein the transducer itself may be positioned a considerable distance from the remainder of the monitoring system. It is also an object of this invention to provide a piezoelectric vibration monitor which is relatively insensitive to the capacitance of the signal path between the transducer and the remainder of the system.

It is a further object of this invention to provide a vibration sensor of the type described which responds either to the dominant one of a plurality of modes of vibration or, alternatively, to the instantaneous peak value of the acceleration. It is also an object of this invention to provide a vibration monitor of either the peak or dominant mode responsive type which may be made selectively responsive only to vibration of greater than a predetermined duration. It is a related object of this invention to provide a vibration sensor which will accurately and repeatedly provide an indication when the sensed vibration exceeds a presettable level.

The above-enumerated objects are attained in the present invention by combining a piezoelectric acceleration transducer having an electrical output directly proportional to the acceleration sensed with novel electronic circuitry having a highly capacitive input impedance, while providing all of the desirable features outlined above. In particular, the transducer may be connected over a long electrical conductor (e.g., of the order of 100 feet) to a variable gain amplifier system employing a high input impedance preamplifier stage, including an extremely stable differential amplifier of novel design, and a variable impedance feedback network connected to the output of the differential amplifier with the preamplifier input, whereby there is provided an accurately controllable variable gain amplifier having substantially capacitive input impedance. The output of the amplifier system is provided to a detector circuit which may be adapted to respond either to the dominant one of a plurality of modes of vibration or to the instantanous peak value thereof. As a result of the particular configuration of the variable gain amplifier system, the detector output is representative at all times of a percentage of a preset level of acceleration. The detector output may then be suitably scaled to provide a continuous calibrated analog output representative of the absolute value of either the instantaneous or average value of the acceleration. The unscaled percentage signal is provided to a suitable limit detector which responds to a fixed signal level to generate an alarm indication. Finally, the level-sensing circuitry may be arranged with variable rise time input circuitry so as to prevent responses thereof to signals of less than a predetermined duration.

The exact nature of this invention, as well as other objects and advantages thereof, will be readily apparent from consideration of the following detailed description and the accompanying drawings in which:

FIGURE 2 is a detailed circuit diagram of the preamplifier, differential amplifier, gain, and feedback control systems shown in FIGURE 1;

FIGURE 4 shows the manner in which FIGURES 2 and 3 are connected to display a circuit diagram of the entire system of FIGURE 1.

Figure 1:
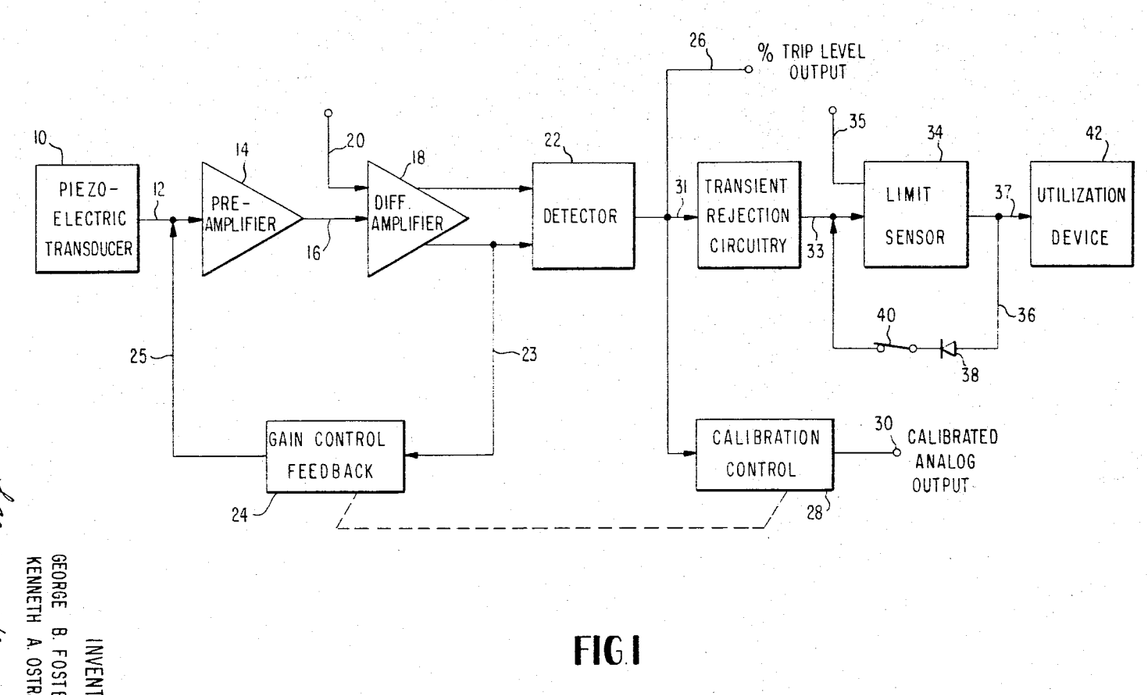
FIGURE 1 is a block diagram of the novel vibration-monitoring system of this invention.

Referring now to FIGURE 1, the monitoring system according to the present invention comprises a suitable piezoelectric transducer 10 connected to the remainder of the system by means of an electrical cable 12. Cable 12 may include a suitable shield, and a pair of conductors surrounded thereby to reduce the effects of interference. Cable 12 is connected to a preamplifier 14, the output of which is provided over signal leads 16 to an extremely stable differential amplifier 18. A second input to the differential amplifier 18, provided over path 20, is a fixed DC reference, whereby there are provided two outputs from the differential amplifier equal in amplitude, but 180 degrees out of phase with respect to each other. One of the outputs from the differential amplifier is provided over lead 23 to a variable-impedance network 24 which provides feedback over lead 25 to the input of preamplifier 14. As will be explained in detail subsequently, variable impedance feedback network 24 serves in a novel manner as a gain control network for the amplifier system comprised of preamplifier 14 and differential amplifier 18, whereby the input level at which an alarm signal is generated by the system is directly controlled by the gain or sensitivity of the amplifier system 14–18.

The two outputs of differential amplifier 18 are connected to a suitable detector 22 which may be adapted to respond either to the instantaneous level of the differential amplifier output or to the average value thereof. In either event, the detector circuitry is so arranged that the fixed maximum of the output thereof will always be equal to the critical vibration level as determined by gain control feedback network 24. For example, the circuitry may be arranged so that an output of ten volts from detector circuit 22 will be sufficient to operate the remainder of the system to cause the generation of an alarm signal. Therefore, if an alarm is to be given when transducer 10 senses an acceleration level of 8 g's, gain control feedback network 24 will be so adjusted that an input signal on lead 12 corresponding to 8 g's will provide a detector output of ten volts. If the input signal corresponds to an acceleration of 4 g's, the detector output will be equal to five volts. Thus, a permanent record of the instantaneous percentage of the critical acceleration level sensed by transducer 10 may be obtained merely by providing the detector output over lead 26 to a suitably calibrated meter, whereby a ten-volt signal will cause a reading of 100 percent.

However, it may be seen that if the gain is adjusted to give an alarm when the acceleration exceeds 4 g's, then a five-volt output from the detector will only represent an acceleration of 2 g's. Accordingly, if an indication or record of the actual value of the acceleration sensed is desired, then it is necessary to provide a suitable scaling network 28 synchronized with gain control feedback network 24 to convert the percentage signal provided at the output of the detector 22 into a level signal related to the particular gain provided by feedback control network 24. As will be described, calibration control 28 may be a suitable voltage-divider network including a variable resistor connected at terminal 30 either to a suitably calibrated meter or recorder.

In any event, the output of detector circuit 22 is connected by means of lead 31 to a transient-rejection network 32 which comprises a variable time constant integrator and includes means to provide a rapid decay when the system is adjusted to respond only to extremely long duration acceleration signals. The output of the transient-rejection circuit 32 is connected over lead 33 to a limit-sensor circuit 34 which compares the detector output with a DC reference provided over lead 35 and provides an output signal to utilization device 40 whenever the reference level is exceeded. If desired, limit sensor 34 may be provided with a feedback path 36 including a diode 38 and a normally closed switch 40 so that limit sensor 34 operates as a latching circuit to provide a continuous output to utilization device 42 after the reference level provided on lead 35 is exceeded. Under such conditions, it is necessary to momentarily open switch 40 to effect the release of the latching circuit whereby utilization device 42 may be reset.

Figures 2, 4:
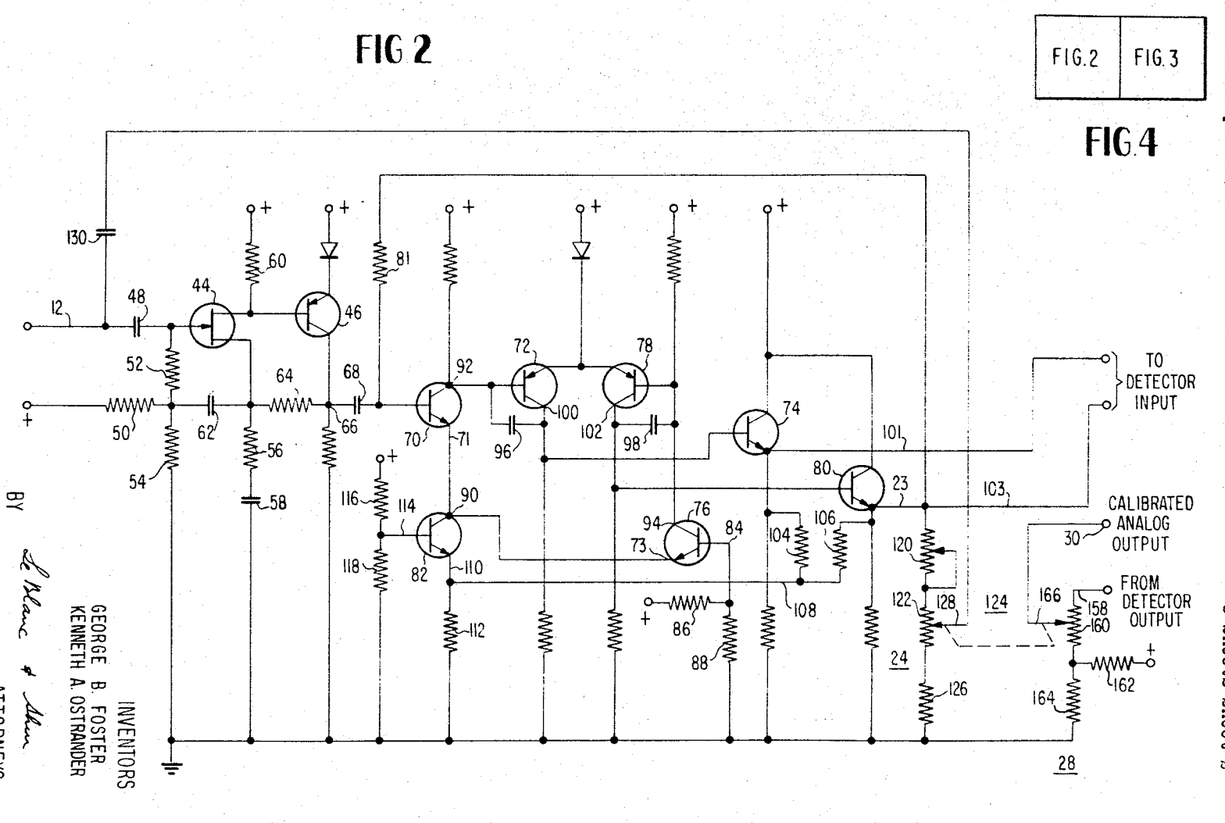

Referring now to FIGURE 2, there is shown the variable gain amplifier system comprising preamplifier 14, differential amplifier 18, and gain control feedback network 24.

Preamplifier 14 comprises two directly coupled transistors 44 and 46, with full feedback from transistor 46 to transistor 44. Input transistor 44 may advantageously comprise a field-effect transistor because of the inherently high input impedance thereof. The input to the preamplifier is provided through signal cable 12 (see FIGURE 1) through coupling capacitor 48 to the gate electrode of field-effect transistor 44. Operating conditions for the field-effect transistor are established by bias networks comprising resistors 50, 52 and 54 for the source electrode, resistor 56 and capacitor 58 for the source electrode and resistor 60 for the drain electrode in well-known fashion. The output of transistor 44 is directly coupled to the base of transistor 46, which may be of any suitable type to supplement the gain provided by transistor 44. A first feedback path is provided by capacitor 62 to effect bootstrapping of transistor 44 whereby to increase the input impedance thereof, typically to a value of the order of at least $3 \times 10^8$ ohms. Such high input impedance is extremely desirable to improve the overall low-frequency response of the amplifier system when the entire system is provided with capacitive feedback as will be explained subsequently. In addition, the collector of transistor 46 is coupled to the source of transistor 44 by means of feedback resistor 64 to improve the linearity, etc., of the preamplifier subsystem. Transistor 46 is arranged so that the output impedance at collector terminal 66 is quite low. Point 66 provides an input to differential amplifier 18 through a suitable coupling capacitor 68.

Differential amplifier 18 comprises a pair of three-stage amplifier channels, and a novel constant-current-control configuration which serves to substantially improve the dynamic range of the two amplifier channels. The first channel receives the information signal from preamplifier 14 through coupling capacitor 68 and comprises an input transistor 70, a voltage amplifier 72, and an emitter follower output stage 74. The second channel, which comprises a corresponding input transistor 76, voltage amplifier 78 and emitter follower output stage 80, is provided with a fixed DC reference signal such that the average value of the amplifier output falls nearly in the center of the linear range of transistor operation, whereby to assure substantial symmetry of the two out-of-phase output waveforms. Control of the average value of the differential amplifier outputs is provided by means of a current-control network including transistor 82.

The DC reference for transistor 82 is provided at base terminal 114 by means of a voltage divider comprising resistors 116 and 118 connected between the system power supply and ground. If the values of resistors 116 and 118 are properly selected, then the DC level provided at the input to transistor 82 can be used to assure that the average value of the outputs of the two channels—i.e., the output DC level when a zero input is provide at terminal 84—will be near the center of the range of linear operation of each channel, so that a given input signal will cause symmetrical excursions from the DC operating level at the output of both emitter followers 74 and 80.

Emiters 71 and 73 of transistors 70 and 76 are connected to collector 90 of current-regulating transistor 82, and at their respective collectors 92 and 94 to a pair of identical voltage amplifiers comprised of transistors 72 and 78. Each of the voltage amplifiers 72 and 78 is provided wtih feedback capacitors 96 and 98, respectively, which operate as Miller feedback couplers to limit the high-frequency roll-off of the amplifier stages. Collectors 100 and 102, respectively, of transistors 72 and 78 are connected to emitter follower output stages 74 and 80, which provide for suitable coupling to the input of detector circuit 22.

A pair of feedback resistors 104 and 106 are connected to the emitter terminals of emitter follower transistors 74 and 80 and are connected together by lead 108 to emitter 110 of transistor 82. As mentioned, transistor 82 operates in conjunction with feedback resistors 104 and 106 and voltage-divider resistor 112 to very accurately control the average value of the differential-amplifier output signals appearing on leads 101 and 103. Base 84 of transistor 76 is provided with a fixed DC reference input by voltage-divider resistors 86 and 88 connected between the system power supply and ground. Resistors 112, 116 and 118 are so chosen that the outputs at 101 and 103 are optimum for maximum dynamic range. This results with proper current flow through transistor 82. The DC level at the base of transistor 82 is slightly more positive than its emitter voltage as determined by the resistors 112, 104 and 106. Hence, if the operating conditions for differential amplifier 18 are properly selected, a given-value input voltage at terminal 66 should cause equal excursions away from the operating point on leads 101 and 103. Accordingly, the signal provided at the summing point of resistors 104 and 106, which is now the average value of the output signals appearing on leads 101 and 103, should still be equal to the DC operating point controlled by resistors 116 and 118. Thus, for proper operation of the differential amplifier, the base-to-emitter voltage on transistor 82 should be substantially zero, independent of the input at terminal 84.

However, assume there is a small deviation in the operating characteristics of one or more of the transistors whereby the operating point or the average value of the two output signals is increased slightly over that desired. This will cause an increase in the signal level at emitter 110, causing transistor 82 to be driven toward cut off.

Since transistor 82 provides the conduction path for the emitter of transistors 70 and 76, it may be seen that changes in the conduction of transistor 82 in response to variations of the average value of the amplifier outputs will provide accurate control of the collector-to-emitter current of transistors 70 and 76.

The current path for transistors 70 and 76 is provided through transistor 82, and therefore, as transistor 82 is turned off, there will be a corresponding decrease in the collector current of transistors 70 and 76. The decrease in the conduction of transistors 70 and 76 is reflected in corresponding decreases in the output of transistors 72 and 78 which will tend to return the output of the emitter followers 74 and 80 to the desired average value.

Correspondingly, decreases in the average value of the differential-amplifier outputs will cause increased conduction through transistors 82 and corresponding increases in the conduction of transistors 70 and 76. This will be reflected in changes in conduction through transistors 72 and 78 which will cause the outputs of transistors 74 and 80 to increase toward the desired average value.

Additional bias stabilization is provided by means of feedback resistor 81 from the output of emitter follower 80 to the input of transistor 70. In addition, feedback resistor 81 provides desirable high-gain characteristics for the overall differential-amplifier configuration.

As previously described, one of the desirable features of the configuration shown in FIGURE 2 is the highly capacitive input impedence charactistic available for matching the capacitive acceleration transducer. In addition, the present configuration is adapted to provide the variable gain used to provide an indication that the acceleration being monitored has reached or exceeded a predetermined critical level. To this end, there is provided the novel feedback control circuit 24 shown in FIGURES 1 and 2. The gain control is provided by means of a voltage-divider network comprised of variable resistor 120, section 122 of a dual potentiometer 124, and a suitable fixed resistance 126. Arm 128 of potentiometer section 122 is connected by feedback capacitor 130 to the input of field-effect transistor 44. As may be understood, if the gain of the entire amplifier configuration is sufficiently high, there will be provided at the input of preamplifier 14 an input impedance which is primarily capacitive, and variable in response to the positioning of slider arm 128 of potentiometer 122. By proper selection of the values of resistors 120, 122 and 126 and feedback capacitor 130, it may be understood that there is provided by the combination of preamplifier 14 and differential amplifier 18, a variable gain amplifier system whose input impedance is at all times capacitive, whereby to substantially overcome the effects of variations in the capacitance of even long conductors between the acceleration transducer 10 and preamplifier 14.

Figure 3:
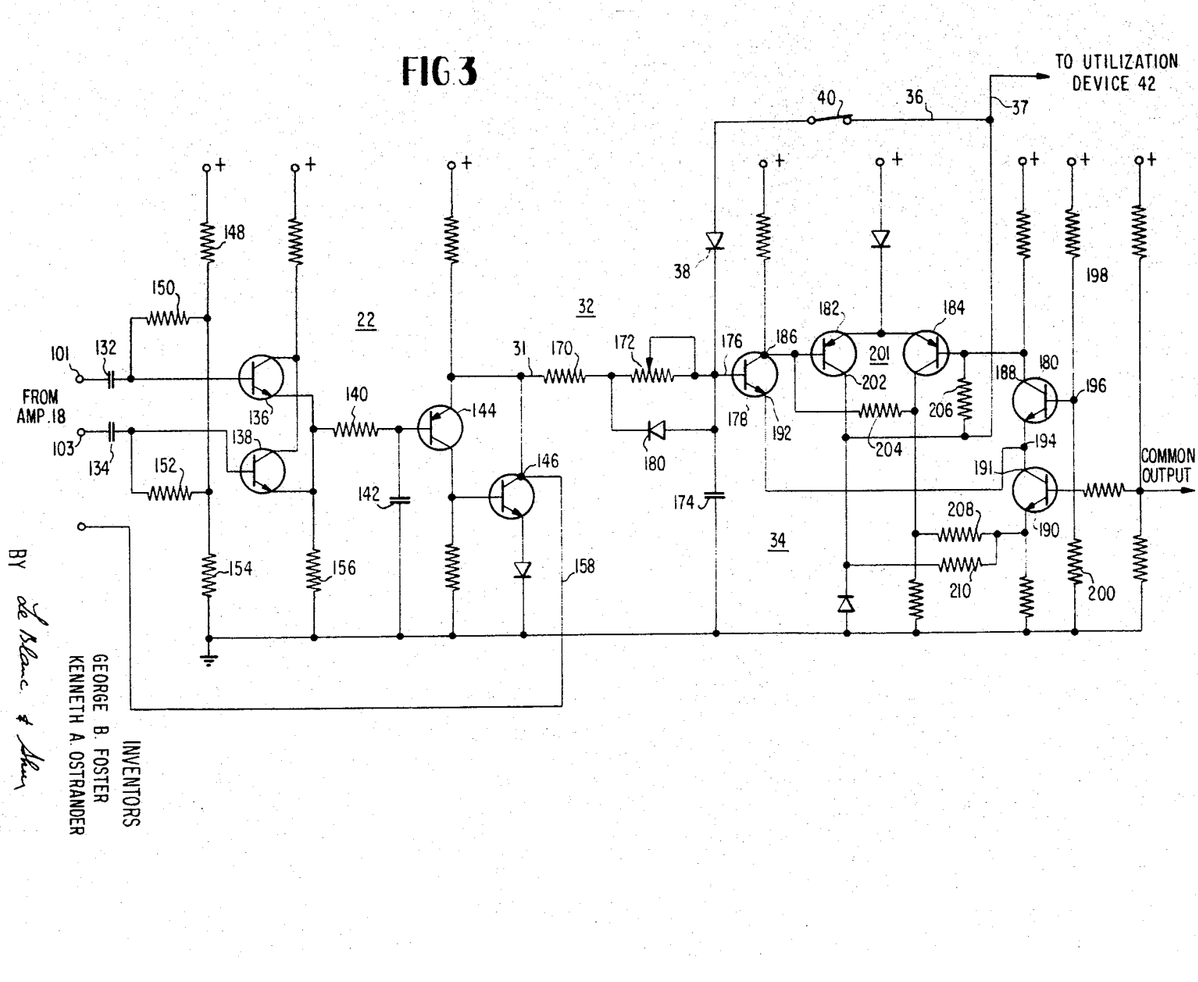
FIGURE 3 is a detailed circuit diagram of the detector circuit, the transient-rejection circuitry, and the limit-sensing circuitry shown in FIGURE 1.

Referring now to FIGURE 3, the signals appearing on leads 101 and 103 at the output of the differential amplifier are provided by means of suitable coupling capacitors 132 and 134 to the base terminals of transistors 136 and 138 of detector 22. Transistors 136 and 138 serve as rectifying current amplifiers for the input signals provided from the differential amplifier. Thus, the high-frequency input signals are converted into a corresponding DC signal whose value is proportional to level of the acceleration measured by transducer 10.

The outputs of transistors 136 and 138 are coupled through an integrating network comprised of resistor 140 and capacitor 142 to the input of a dual-stage current amplifier comprised of transistors 144 and 146. Transistors 136 and 138 are chosen to be of the NPN type in order to provide a positive output signal from the detector. The operating characteristics of transistors 136 and 138 are controlled by a biasing network comprised of resistors 148, 150, 152 and 154. PNP transistor 144 is provided in a dual-stage current amplifier to compensate for temperature variations in the operating characteristics of transistors 136 and 138.

As previously discussed, it is often desirable that the detector circuit 22 be readily adaptable for response either to the peak value or the average or dominant mode value of the acceleration. Accordingly, in the present configuration, this adaptability can be readily accomplished by appropriate variation of the values of resistors 140 and 156. In particular, when it is desired that the detector respond to the instantaneous peak value of the acceleration, resistor 140 is selected to be extremely small and resistor 156 is made relatively large. Accordingly, capacitor 142 and resistor 140 serve as an integrating network with an extremely short time constant so that the voltage across capacitor 142 fairly rapidly follows variations in the voltage appearing at the emitter terminals of transistors 136 and 138.

On the other hand, if it is desired that the detector respond only to the dominant one of a plurality of vibration modes sensed by transducer 10, resistor 140 is made relatively large, while resistor 156 is made fairly small. The integrating network 140–142 then has a longer time constant, whereby the voltage provided across capacitor 142 is a true representation of the dominant mode of vibration. Thus, while it might normally be desirable for the detector circuit to respond to the peak values of the acceleration signal, it is seen that the detector network may be readily adapted to respond only to the dominant mode of operation. In fact, if it is desired, a suitable toggle switch or other switching means may be provided to permit rapid variation of the detector response.

As was previously described, the gain variation provided by feedback network 24 for the amplifier system 14–18 results in a signal appearing at the output of detector 22 which represents a percentage of the minimum level at which an alarm indication is to be given. The signal appearing on lead 158 may be provided directly to a recorder or meter as an indication of the percentage of the preselected alarm level. In addition, by properly scaling this signal, in accordance with the gain of amplifier system 14–18, a true analog of the actual acceleration may be provided.

Thus, in FIGURE 2, the percentage signal appearing on lead 158 at the output of detector circuit 22 is provided to the second section 160 of dual potentiometer 124. Potentiometer section 160 is connected to ground through an appropriate voltage-divider network comprising resistors 162 and 164 to match the operating levels chosen for the remainder of the system. Arm 166 of potentiometer 160, which would normally be mounted on the same shaft as arm 128, is connected to an output terminal 30 to provide the calibrated analog output. Appropriate selection of potentiometer 160 and resistors 162 and 164, and the use of appropriate scale factor on the recorder or other instrument connected at terminal 30, will result in the provision of a signal representative of the actual acceleration measured by transducer 10.

Referring again to FIGURE 3, the unscaled output of detector 22, whose maximum value will always represent the level at which an alarm indication is to be given, is provided to transient-rejection circuitry 32 comprising fixed resistor 170, variable resistor 172 and shunt capacitor 174. The output of transient-rejection circuit 32 is connected to base 176 of transistor 178 and serves as a variable time constant network so that either peak or average values of acceleration of extremely short duration will not cause an alarm indication. When moderately long time constants are provided—i.e., by large values of variable resistor 172—it may be necessary to provide a shunt diode 180 to permit rapid reset of limit sensor 134 when it is operating in a latching mode as subsequently described.

Limit sensor 34 itself comprises a differential comparator including transistors 178 and 180, with a bistable feedback network 201 comprised of transistors 182 and 184 connected between the collector terminals 186 and 188 of the comparator transistors. A fifth transistor 190 serves as a constant current source for emitters 192 and 194 of transistors 178 and 180. The signal is provided through transient-rejection circuit 34 to transistor 178, while a fixed DC reference is provided as a second input at terminal 196 of transistor 180 by a voltage divider comprised of resistors 198 and 200. Emitters 192 and 194 of comparator transistors 178 and 180 are connected in common to collector 191 of current-control transistor 190.

Bistable circuit 201, comprised of transistors 182 and 184, is connected between collectors 186 and 188 and serves to provide an indication by its conduction state of whether or not the reference level at base 196 is exceeded by the signal level at base 176.

A feedback path between constant current source 190 and the bistable circiut 201 comprised of resistors 208 and 210 assures that sufficient current will flow through transistor 190 so that only one of transistors 182 and 184 can be in its saturated condition, thereby assuring that the opposite transistor will be cut off.

Bistable circuit 201 is of known configuration, and includes feedback resistors 204 and 206 which provide regeneration and establish a signal level which must be overcome in order for the conductivity state of circuit 201 to be reversed.

As may be understood, a positive difference between the signal at base 176 and that at base 196 is indicative that the preset acceleration level has been exceeded. Conversely, a negative difference represents a nonalarm condition. Assuming that switch 40 is kept open, proper selection of circuit parameters will assure that a positive difference reflected at collector 186 will cause transistor 182 to assume its conducting state and transistor 184 to assure its nonconducting state; while a negative difference, reflected at collector 188, will cause the conductivities of transistors to be reversed.

In the above mode of operation, it may be seen that the bistable circuit 201 will effectively follow the signal appearing at base terminal 176 as it passed through the alarm-indication level. However, if it is desired that a continuous indication be given once the alarm-indication level is exceeded, the feedback path 36 comprised of diode 38 and switch 40 is connected between the output of transistor 182 and the input 176 of transistor 178. In this way, after transistor 182 enters its conducting state, the feedback to the base 176 of transistor 178 assures that the signal at collector terminal 186 remains at a level sufficient to keep transistor 182 in its conductive state, independent of the signal at base 176. Thus, once the preset acceleration level is exceeded, an output is continuously provided over lead 37 to utilization device 42 irrespective of further variation in the acceleration. In order to clear the alarm signal, switch 40 is momentarily opened, permitting the conductivity of transistors 182 and 184 to be reversed, thereby returning transistor 182 to its original state.

If utilization device 42 is a relay or other current-responsive indicator device, it may be connected by lead 37 to collector 202 of transistor 182. Thus, when the latter transistor is conducting, there is sufficient current to operate the indicator relay, to provide an alarm or to turn off the machine. If utilization device 42 is voltage responsive, lead 37 may be connected to the base of the transistor to operate the indicator in response to the high value of cutoff voltage. However, feedback path 36 would remain as shown in FIGURE 3.

To provide a nonzero reference level for an external meter or recorder, the signal appearing at the base 212 of transistor 190 may be used. Of course, other reference levels, or ground potential, may be used if desired.

While the above description represents the preferred embodiment of this invention, a number of modifications may be made to meet varied requirements. For example, if it is desired to provide an alarm indication when the sensed acceleration exceeds a succession of predetermined critical levels, the same may be readily achieved by providing the signal on lead 16 in FIGURE 1 to additional differential amplifiers 18, detectors 22, transient-rejection circuits 32, and limit sensors 34 adapted to operate associated utilization devices 42 when the input signal exceeds preset reference levels provided by voltage dividers such as 198–200 in each of the limit sensors, which represent fixed percentages of the primary limit-sensor level.

In addition, while the use of a piezoelectric sensor provides a number of desirable characteristics as outlined above, it is possible to adapt the system of FIGURE 1 for operation with other types of transducers capable of sensing either acceleration or other desired physical properties. To this end, the primary capacitive feedback associated with gain control network 24 would no longer be needed, whereby the entire feedback could be provided to the input of differential amplifier 18 in substantially resistive form. In this way, the desirable high-impedance characteristics of the preamplifier transistor 44 would be retained, thereby facilitating the matching of a variety of transducers to the system. In addition, various circuit modifications obvious to those skilled in the art in the light of the above disclosure may readily be made to adapt the described system to various particular environments.

The invention may be embodied in other specific forms without departing from the spirit or essential characteristics thereof.

What is claimed and desired to be secured by United States Letters Patent is:

1. A vibration monitor comprising: an accelerometer responsive to the source of vibration; an amplifier system connected to said accelerometer; a gain control network connected between the input and output of the amplifier system to provide variable, primarily capacitive feedback and a highly capacitive input impedance for the amplifier system; first circuit means connected to the amplifier output to provide a signal representative of the level of the acceleration being measured; and second circuit means responsive to the output of said first circuit means to provide an indication when the output exceeds a fixed reference level, the level of acceleration necessary to provide an indication being controlled by the variable feedback to the amplifier; said amplifier system including a preamplifier having a first high impedance input stage and a second amplifying stage providing a low output impedance, a fixed DC reference, and a difference amplifier connected to the second amplifying stage and to said fixed DC reference, the difference amplifier providing two outputs equally displaced from a substantially fixed DC operating level, 180° out of phase; the gain control network comprising a capacitor and means to provide a variable series resistance between one terminal of the capacitor and one output of the difference amplifier, the second terminal of the capacitor being connected to the input of the preamplifier, and at least the second output of the difference amplifier being connected to the first circuit means.

2. The apparatus of claim 1 where the difference amplifier comprises first and second comparator stages connected, respectively, to the output of the preamplifier and to the fixed DC reference, the comparators having a common current path; a current-control device connected to the common current path; and means connected to the two outputs of the difference amplifier to determine the average value thereof, and responsive to deviations of the average value from the fixed DC operating level to correctively vary the current flow through the common current path.

3. The apparatus of claim 1 where the first circuit means is a detector circuit, and including scaling means connected to the detector output to provide a signal analog of the vibration level being sensed, and including further means connected to the detector output to provide an indication of the vibration level relative to the fixed reference level.

4. The apparatus of claim 3 where the scaling means comprises a variable scaling resistor connected to the detector output, the value of the scaling resistor and the value of the variable series resistance in the gain control network being synchronously controlled.

5. A vibration monitor comprising: a transducer responsive to the source of vibration; an amplifier system connected to said transducer; a gain control network connected between the input and output of the amplifier system to provide variable, primarily capacitive feedback and a highly capacitive input impedance for the amplifier system; first circuit means connected to the amplifier system output to provide a signal representative of the level of the vibration being measured; and second circuit means responsive to the output of said first circuit means to provide an indication when the output exceeds a fixed reference level, the level of vibration necessary to provide an indication being controlled by the variable feedback to the amplifier; said second circuit means including rejection means responsive only to signals greater than a variable predetermined duration, a fixed DC signal source, and sensing means connected to the rejection means and to said fixed DC signal source to provide an output as said indication when the output of said rejection means exceeds said fixed DC signal.

6. The apparatus of claim 5 where the sensing means provides a continuous output once the DC signal level is exceeded, irrespective of further changes in the output of the rejection means.

7. The apparatus of claim 5 where the sensing means comprises a comparison circuit connected to the output of the rejection means and to the fixed DC signal, and providing a first output when the output of rejection means is greater than the DC signal and a second output when the DC signal is greater; a bistable switch connected to the comparison circuit and adapted to assume its first state in response to the first output and its second state in response to the second output; and means connected to the bistable switch to operate an indicator in response to the first output of the comparator.

8. The apparatus of claim 7 further including feedback means connecting the bistable circuit to the input of the comparator to maintain the bistable switch in its first state irrespective of the output of rejection means, the feedback means having therein reset means for selectively returning the bistable switch to its second state.

9. A vibration monitor comprising: a piezoelectric acceleration transducer attached to the source of vibration; an amplifier system connected to the transducer and adapted to provide two out-of-phase alternating current signals; said amplifier system including a preamplifier having a first high impedance input stage connected to the piezoelectric transducer, a second amplifying stage providing a low output impedance, a fixed DC reference, and a difference amplifier having two inputs and two outputs, the inputs being connected to the second amplifying stage and to said fixed DC reference; a gain control network connected between one of the difference amplifier outputs and the preamplifier input to provide variable, primarily capacitive feedback, and a high capacitive input impedance for the amplifier system; said gain control network comprising a capacitor and means to provide a variable series resistance between one terminal of the capacitor and said one output of the difference amplifier, the second terminal of the capacitor being connected at the input to the preamplifier; a detector circuit being connected to at least the second difference amplifier output to provide a signal representative of the level of the alternating current signal; and means responsive to the output of the detector to provide an indication when the detector output exceeds a fixed reference level, the level of vibration necessary to provide an indication being controlled by the variable feedback to the amplifier system.

10. The apparatus of claim 9 including scaling means connected to the detector output to provide a signal analog of the vibration level being sensed, and comprising a variable scaling resistor connected to the detector output, the value of the scaling resistor and the value of the variable series resistance in the gain control network being synchronously controlled.

11. The apparatus of claim 10 where the means responsive to the detector output includes rejection means responsive only to signals of greater than a variable predetermined duration, and sensing means connected to the rejection means and to a fixed DC signal to provide an output when the output of the rejection means exceeds the fixed DC signal.

12. The apparatus of claim 11 where the sensing means comprises a comparison circuit connected to the output of the rejection means and to the fixed DC signal, and provides a first output when the output of rejection means is greater than the DC signal and a second ouput when the DC signal is greater; a bistable switch connected to the comparison circuit and adapted to assume its first state in response to the first output and its second state in response to the second output; and means connected to the bistable switch to operate an indicator in response to the first output of the comparator.

(References on following page)

References Cited

UNITED STATES PATENTS

| | | |
|---|---|---|
| 3,048,775 | 8/1962 | Calvert. |
| 3,130,329 | 4/1964 | Cother. |
| 3,252,001 | 5/1966 | Thompson et al. _ 340—261 XR |
| 3,195,034 | 7/1965 | Bensema _______ 73—71.4 XR |
| 3,201,776 | 8/1965 | Morrow et al. ___ 73—71.4 XR |

RICHARD C. QUEISSER, Primary Examiner

JOHN P. BEAUCHAMP, Assistant Examiner

U.S. Cl. X.R.

73—71.4, 517; 340—261, 262

UNITED STATES PATENT OFFICE
CERTIFICATE OF CORRECTION

Patent No. 3,455,148                         July 15, 1969

George B. Foster et al.

It is certified that error appears in the above identified patent and that said Letters Patent are hereby corrected as shown below:

Column 5, line 42, after "maximum" insert -- value --. Colum 6, line 75, "provide" should read -- provided --.

Signed and sealed this 12th day of May 1970.

(SEAL)
Attest:

Edward M. Fletcher, Jr.                         WILLIAM E. SCHUYLER, JR.
Attesting Officer                                   Commissioner of Patents